2,992,568
CONTROL CABLE TENSIONING DEVICE

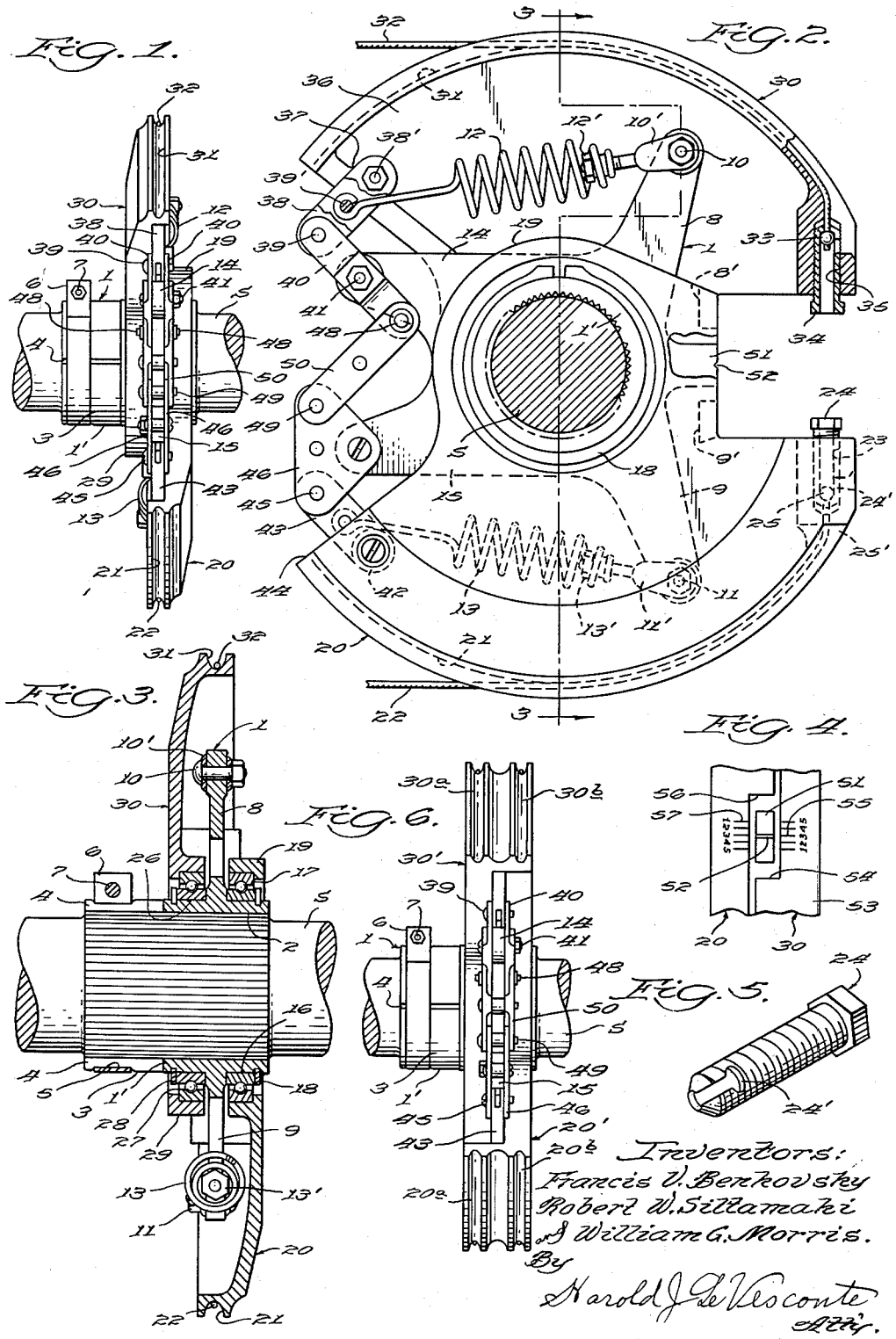

Francis V. Benkovsky and Robert W. Siltamaki, Burbank, and William G. Morris, Van Nuys, Calif., assignors to Aero Mfg. Co., North Hollywood, Calif., a corporation of California
Filed Feb. 11, 1959, Ser. No. 792,623
12 Claims. (Cl. 74—501.5)

This invention relates to cable tension regulator devices and particularly for maintaining a uniform tension on the control cables of aircraft under varying and changing conditions in the aircraft itself deriving from expansion and contraction due to temperature changes as well as dimensional changes resulting from deflection of the fuselage or wings incident to flying conditions as, for example, changes in course of the aircraft.

An object of the present invention is to provide a cable tension regulating device mountable upon a shaft actuated by a controlling means for the aircraft and from which a pair of cables extend to the surfaces to be operated thereby, which is effective to maintain a substantially uniform amount of tension on the cables attached thereto while compensating both for dimensional changes in the aircraft frame resulting from temperature changes and from dimensional changes incident to warping or flexure of the frame due to stresses caused by changes in the path of flight of the aircraft.

Another object of the invention is to provide a device of the above character which is of simple construction, is composed of few parts, which is susceptible of economical manufacture, which is readily installed in the aircraft, and which is reliable and efficient for its intended purpose.

With the foregoing objects in view, together with such additional objects and advantages as may subsequently appear, the invention resides in the parts, and in the construction, combination and arrangement of parts described, by way of example, in the following specification of certain presently preferred embodiments of the invention disclosed in the following specification, reference being had to the accompanying drawings which form a part of said specification and in which drawings:

FIG. 1 is an edge elevational view of a device embodying the present invention,

FIG. 2 is an enlarged scale elevational view taken from the right hand side of FIG. 1, FIG. 3 is a medial sectional view taken on the line 3—3 of FIG. 2, FIG. 4 is a fragmentary view taken of the area indicated by the arrowed line 4—4 on FIG. 2 showing the centering means of the device, FIG. 5 is a perspective view of one of the cable length adjusting elements, and FIG. 6 is a view similar to FIG. 1 but showing a modified form of the device useful in dual control or training airplanes.

Referring first to FIGS. 1–4 the device is shown applied to a shaft S which for example, may be the shaft on which the control wheel or stick of the plane used to control the elevators and ailerons of an aircraft, said shaft being provided with an enlarged diameter portion having a surface comprising serrations extending parallel to the axis of the shaft.

The device comprises a base member 1 including a hub 1' having a bore 2 extending therethrough, said bore having grooves extending parallel to the axis thereof and adapted to mate with the serrations on the shaft. At one end thereof the hub is provided with an axial extending portion 3 which is intersected by a series of slots 4 to form a series of flexible portions and formed in the outer surface of these portions is a peripheral groove 5 in which a clamp 6 is mounted adapted to be drawn up by a bolt or screw 7 to clamp the hub 1' securely to the shaft S.

The hub 1', intermediate its ends, is provided with a pair of oppositely tangentially extending arms 8 and 9 which carry transversely extending bolts 10 and 11, respectively, serving as anchors for one end each of a pair of yokes 10' and 11' each terminating in a threaded end respectively carrying nuts 12' and 13' confined within the coned ends of tension springs 12 and 13. The hub member is further provided with a second pair of generally radially projecting arms 14 and 15, said arms being disposed substantially in the same radial plane as the members 8 and 9 and having reference to FIG. 2, the arm 14 being disposed substantially 90° in a counter clockwise direction from the arm 8 and the arm 15 being disposed substantially 90° in a clockwise direction from the member 9.

The end of the hub member 1 opposite the end carrying the securing clamp 6 is provided with an external bearing surface 16 (see FIG. 3) upon which a ball bearing means 17 is mounted and secured thereon between the adjacent faces of the members 8 and 9 and the arms 14 and 15 at one side and a snap ring 18 engaging a groove formed in the hub adjacent the edge thereof. The outer race of this ball bearing supports the hub 19 of a quadrant element 20 having a groove 21 formed in the periphery thereof for reception of a cable 22, said cable being one of the pair of cables extending between the actuator for the shaft S and the control surface of the aircraft to be operated thereby. At the side thereof opposite the arms 14 and 15 the quadrant 20 carries a threaded bore 23 in which a hollow stud 24 is mounted, said hollow stud having a T-slot 24' in the end thereof adapted to receive the stop element 25 clamped to the end of the cable 22 insertable through a lateral opening 25' in the quadrant. The cable thence extends from the stud into the groove 22 and thence to the control surface. The threaded stud 24 provides a means whereby the cable can be initially tensioned and, as will be later explained, so tensioned that the cables will be equally tensioned with equal amounts of take-up by the yielding action of the device available at each side of its normal position of repose.

The hub 1' at the side thereof adjacent the clamping portion 3 thereof is provided with a second bearing surface 26 carrying a second ball bearing means 27 similar to the bearing 17, said bearing being similarly secured on said hub by a snap ring 28. The outer race of the ball bearing 27 supports the hub 29 of a second quadrant 30 mounted disposed opposite to the quadrant 20, said quadrant having a peripheral groove 31 formed therein for reception of the other cable 32 of the pair of cables, said cable 32 being similarly anchored by a stop element 33 secured thereto and engaging the outer end of a screw element 34 threadedly engaging a bore 35 in the quadrant 30 in the same manner as in the quadrant 20.

The quadrants 20 and 30 are yieldingly urged to rotative movements relative to the frame member on which they are mounted in directions tending to take up on the respective cables attached thereto by toggle means now to be described. The inner face of the web 36 extending between the hub and rim of the quadrant 30 and adjacent the edge thereof from which the cable 32 extends toward the control surface is provided with an inwardly laterally extending boss 37 to which one end of a link 38 is pivotally connected by a bolt 38'. The other end of the link 38 is pivotally connected by a pin 39 to the ends of a pair of parallel rock levers 40, pivotally mounted at 41 on opposite sides of the outer end of the arm 14. The levers 40 and link 38 normally form approximately a right angle with each other. The link 38 is provided with a medial slot in one edge thereof into which the opposite end of the spring 12 extends and is secured by a cross pin 39′, the tension of the spring thus providing the bias to tend to urge the toggle joint thus formed by the link 38 and levers 40, 40 to a straight position with resultant movement of the quadrant 30 in a direction tending to take up the cable 32.

The quadrant 20 is similarly provided with a boss 42, corresponding to the boss 37 on the quadrant 30 to which one end of a link 43 is pivotally connected, said link extending beyond the end face 44 of the quadrant 20 end face and having its other end connected by a pin 45 between a pair of bell crank levers 46, 46 pivotally mounted at 47 at opposite sides the distal end of the arm 15. The link 43 is provided with a medial slot in which the end of the tension spring 13 is secured by a pin 47 tension of this spring acting on the toggle joint formed by the link 43 and the levers 46, 46 tends to move the quadrant 20 in a direction tending to take up slack and to maintain tension upon the cable 22.

The opposite ends of the straight levers 40, 40 and the bell crank levers 46, 46 are interconnected by pivot pin means 48, 48 and 49, 49 at the opposite ends of a pair of links 50, 50 so that if any movement of one cable or the other occurs from strain on the aircraft or change in the length thereof due to temperature conditions, the compensation made on one cable by the movement of a quadrant will be compensated for by equivalent movement of the other quadrant. It will be noted that if, for example, there is additional strain placed on the cable 22 so that the quadrant 20 is caused to tend to move in a clockwise direction relative to the main frame member, such action will tend to close the toggle formed by the link 43 and the levers 46, 46 in opposition to the bias of the spring 13 and any consequent movement of the levers 46, 46 will be communicated through the link 50 and levers 40, 40 to the quadrant 30 and cable 32 through the compensatory action of toggle formed by the levers 40, 40 and the link 38 in opposition to the bias of the spring 12.

The initial tension can be applied to the cables 22 and 32 through appropriate adjustment of the threaded members 24 and 34 so that said adjustment effecting a desired extension of the springs 12 and 13 and the extension thereof from their normal position of repose being indicative of the initial tension to be placed on the cables. Additionally, the threaded members are adjusted so that the quadrants 20 and 30 have equal capabilities of movement in response to stresses placed on the cables. To this end, the base member 1 is provided with a radially extending member 51 carrying an indicia mark 52. The quadrant 30 is provided with a corresponding face portion 53 including a stop member 54 engageable with one edge of the member 51 to limit the extent of relative movement between the quadrant and the base member in one direction. The face 53 is preferably provided with a series of indicia marks as indicated at 55 whereby members 34 may be so adjusted that when the aircraft is in repose on the ground in normal temperatures the indicia mark 52 will be opposite the center graduation of the ones indicated at 55. The quadrant similarly is provided with a stop member 56 and graduations 57 to be brought into corresponding registry with the graduation reference mark 52 by adjustment of the member 24. The extent of movement of the quadrant 30 in the opposite direction is limited by a stop shoulder 8′ engageable with the edge of the arm 8 and the quadrant 20 is similarly provided with a shoulder 9′ engageable with the edge of the arm 9.

Thus it is that the above described device will subject the control cables leading from an actuating lever or wheel to a control surface of an aircraft maintaining uniform tension on both cables at all times and under all conditions of stress which may shorten or lengthen the distance between one or the other of the cables in the extent thereof between the operating device to which one end is attached and the control surface to which the other end is attached and that if one of the pair of cables should be subjected to stress sufficient to normally cause slack in the other of the cables an occurrence of such slack will be obviated by the automatic take-up of the device through the above-described means which causes the tension forces affecting each quadrant to react directly upon the other quadrant.

Referring finally to FIG. 5, there is shown a similar device except that the quadrants 20′ and 30′ are provided respectively with cable receiving grooves 20a and 20b and 30a and 30b. The grooves 20a and 30a in these quadrants extend to the control surfaces in the same manner as in the first described form of the device. The grooves 20b and 30b carry cables which extend to another device of the form shown in FIG. 1 but which is attached to a second "stick" or other control for aircraft as is employed for operation by a student in training planes, so that the compensation for changes in the length of all of the cables is compensated for in the same manner. The various linkages extending between the quadrants and the main frame member are identical in the two forms and therefore the same numerals have been applied to the portions of those linkages observable in FIG. 5 as have also other portions of the device which are identical with the first described form.

While in the foregoing specification, there has been described certain presently preferred embodiments of the invention, such disclosure has been by way of example only and, accordingly, it will be understood that the invention is not to be deemed to be limited to the forms thereof so disclosed but includes, as well, all such changes and modifications in the parts, and in the construction, combination and arrangement of parts as shall come within the purview of the appended claims.

We claim:

1. In a control cable tension maintaining device, a body member mountable upon an oscillatable element of an aircraft control means for movement therewith coincident with the axis of movement of said oscillatable control element, a pair of cable receiving quadrants each mounted for independent oscillation upon said body member about an axis parallel to the axis of oscillation of said oscillatable element, each of said quadrants having a peripheral cable receiving groove and means at one end of said groove for securing one end of a control cable to the quadrant; the cables thence extending along at least a portion of said grooves in their respective quadrants and in opposite directions about the axis of movement of said oscillatable control element and thence extending generally parallel to each other to opposite sides of a control surface operating means, and means for constantly maintaining equalized tension on both cables comprising a pair of separate spring operated means extending one each between each of said quadrants and said body member and tension equalizing means constantly operably interconnecting both of said spring operating means; each of said spring operated means being biased to tend to rotate the quadrant to which it is connected in a direction tending to wind up the cable connected to that quadrant.

2. A cable tension maintaining means as claimed in claim 1 in which said body member comprises a hub mountable upon said oscillating control member and in which said quadrants are rotatably mounted on opposite ends of the exterior of said hub.

3. A cable tension maintaining device as claimed in claim 1 in which adjacent ends of said grooves in said quadrants terminate in cable securing means which are adjustable longitudinally of the cable operable to equalize the lengths of the cables and to determine the extent of the initial tension applied thereto.

4. A control cable tension maintaining device as claimed in claim 1 in which one of said spring operated means comprises a toggle formed of a pair of hingedly interconnected links having their distal ends connected respectively to one of said quadrants and to said body member, and a tension spring having one end thereof connected to said body member and the opposite end thereof connected to one of said links adjacent to the interconnection of said links forming said toggle joint and in which the other of said spring operated means is identical to said first spring operated means and is similarly interposed between the other of said quadrants and said body member.

5. A cable tension maintaining means as claimed in claim 4 in which both of said spring operated means are operatively interconnected by a link effective to transmit movement of one of said means to the other of said means with resultant constant equalization of the tension applied on the cables.

6. In a control cable tension maintaining device, a body member mountable upon an oscillating element of an aircraft control means for movement therewith, a first quadrant shaped sheave element mounted on said body member for independent limited movement about an axis parallel to the axis of movement of said oscillatable element and having an arcuate cable receiving groove at the periphery thereof, a second quadrant shaped sheave element also mounted on said body member for limited movement about an axis parallel to the axis of movement of said oscillatable element; said second sheave element having an arcuate cable receiving groove at the periphery thereof and being disposed substantially diametrically opposite the cable receiving groove of said first sheave element with respect to the said axis of movement of said oscillatable element; one end of each of said grooves in each of said sheave elements having securing means for one each of a pair of control cables, each of which cables thence extends along its respective groove for at least a portion of the length of the groove and thence extends to the respective opposite sides of a control surface operating means of the aircraft, and means for constantly maintaining a constant equal degree of tension on the cables comprising a first spring operated means interposed between said body member and said first sheave element operative constantly to tend to rotate said first sheave element relative to said body member in a direction effective to impose a tension on the cable secured thereto, a second spring operated means extending between said body member and said second sheave element tending to rotate said second sheave element in an opposite direction relative to the rotational direction of said first sheave element with resultant imposition of tension on the cable secured to said second element, and other devices carried by said body member and operatively interconnecting both of said spring operated means for movement of each induced by movement of the other and effective by said interconnection to maintain the imposed tensions on the respective cables at substantially equal values regardless of environmental conditions affecting the aircraft.

7. A tension maintaining means as claimed in claim 6 in which said first spring operated means comprises a toggle joint composed of a pair of links pivotally interconnected at one end thereof and having their distal ends attached to said body member and one of said sheave elements and a spring means connected to one of the links adjacent the said pivotal interconnection constantly operative to tend to spread said toggle apart with resultant tendency for rotative movement of said first sheave element in one direction on said body member, and in which said second spring operated means similarly interconnects said body member and second sheave element with resultant tendency for rotation of said second sheave element in the opposite direction on said body member.

8. A tension device as claimed in claim 6 in which said sheave elements are, respectively, mounted at opposite sides of said body member for independent rotative movement thereon.

9. A tension regulating device as claimed in claim 6 in which said sheave elements include cable securing means adjustable longitudinally of the cable effective to provide the desired initial tension thereon and in which said sheaves each carries a set of graduations disposed adjacent to a reference mark carried by said body member whereby the extent of rotative movement of said sheaves in opposite directions can be initially balanced by said adjustment.

10. A control cable tension maintaining device as claimed in claim 1 in which each of said sheaves in addition to the aforesaid cable receiving grooves, carries a second cable receiving groove extending parallel to said first named grooves and by which said sheaves are connected to a second surface controlling device, as for example, in a training plane.

11. In a control cable tension maintaining device, a body member comprising a hub mountable upon an oscillatable element of an aircraft control means for movement therewith coincident with the axis of movement of said oscillatable control element and having external bearing surfaces adjacent each end thereof and a series of arms projecting radially from the mid-length thereof, a first cable receiving quadrant mounted on the bearing surface at one end of said hub for free oscillating movement thereon, a second cable receiving quadrant mounted on the bearing surface at the other end of said hub; the said quadrants having peripheral cable receiving grooves disposed substantially diametrically opposite each other with respect to the axis of oscillation of the oscillatable element on which said body member is mountable, spring operated means extending between two of said arms of said body member and said first quadrant tending to rotate said first quadrant in a direction effective to wind up on a cable connected thereto and extending along the groove thereof, a second spring operated means extending between two other arms on said hub and said second quadrant tending to rotate said second quadrant hub in a direction opposite the direction of movement of said first quadrant with resultant winding up of the cable connected to and extending along the groove of said second quadrant, and means interconnecting both of said spring operated means tending to impose the reactive forces of the cable tension maintaining movements of each of said quadrants on the other of said quadrants with resultant maintenance of total tension on the pair of cables connected thereto.

12. A cable tension maintaining device as claimed in claim 11 in which one of said spring operated means includes a pair of links having their adjacent ends pivotally interconnected and their distal ends connected respectively to said body member and said first quadrant and said links being angularly disposed to each other to form a toggle joint, and a tension spring extending between said body member and said toggle joint constantly operative to bias said toggle joint to impose cable tension applying rotative movement to said first quadrant, and a second, corresponding toggle means similarly interposed between said body member and said second quadrant.

References Cited in the file of this patent

UNITED STATES PATENTS

| | | |
|---|---|---|
| 1,474,996 | Carson | Nov. 20, 1923 |
| 2,581,080 | Cushman | Jan. 1, 1952 |
| 2,753,584 | Oishei | July 10, 1956 |
| 2,841,030 | Wrighton | July 1, 1958 |
| 2,921,480 | Wrighton et al. | Jan. 19, 1960 |
| 2,934,971 | Phelan | May 3, 1960 |